(12) United States Patent
Mazzoni

(10) Patent No.: US 11,052,705 B2
(45) Date of Patent: Jul. 6, 2021

(54) FILLING ELEMENT FOR TIRES OF OFF-ROAD MOTOR VEHICLES

(71) Applicant: GIBSON Power Tech GmbH, Krefeld (DE)

(72) Inventor: Luigi Mazzoni, San Casciano Val di Pesa (IT)

(73) Assignee: GIBSON POWER TECH GMBH, Krefeld (DE)

(*) Notice: Subject to any disclaimer, the term of this patent is extended or adjusted under 35 U.S.C. 154(b) by 670 days.

(21) Appl. No.: 15/740,188

(22) PCT Filed: Jun. 28, 2016

(86) PCT No.: PCT/IB2016/053850
§ 371 (c)(1),
(2) Date: Dec. 27, 2017

(87) PCT Pub. No.: WO2017/002011
PCT Pub. Date: Jan. 5, 2017

(65) Prior Publication Data
US 2018/0186187 A1 Jul. 5, 2018

(30) Foreign Application Priority Data

Jun. 30, 2015 (IT) .................... 102015000029077

(51) Int. Cl.
*B60C 5/00* (2006.01)
*B60C 19/12* (2006.01)
*B60C 17/06* (2006.01)

(52) U.S. Cl.
CPC ............ *B60C 5/002* (2013.01); *B60C 17/065* (2013.01); *B60C 19/12* (2013.01); *B60C 2200/10* (2013.01); *B60C 2200/14* (2013.01)

(58) Field of Classification Search
CPC .......... B60C 5/002; B60C 7/105; B60C 19/12
See application file for complete search history.

(56) References Cited

U.S. PATENT DOCUMENTS

| 783,720 A | * | 2/1905 | Case | ...................... | B60C 17/06 |
| | | | | | 152/158 |
| 4,371,023 A | * | 2/1983 | Campagna | .............. | B60C 17/06 |
| | | | | | 152/158 |

FOREIGN PATENT DOCUMENTS

| CN | 203019987 | | 6/2013 |
| DE | 2648919 | * | 5/1978 |
| EP | 151093 | * | 8/1985 |
| EP | 134035 | * | 11/1987 |
| EP | 2226203 A1 | | 9/2010 |

(Continued)

OTHER PUBLICATIONS

Machine translation of FR 2755400, 1998.*

(Continued)

*Primary Examiner* — Justin R Fischer
(74) *Attorney, Agent, or Firm* — Lucas & Mercanti, LLP

(57) ABSTRACT

Filling element ("mousse") for tires of off-road motor vehicles. The filling element is provided with circular grooves. It is made of expanded polymeric material for longlife even under extreme conditions of external temperature, speed of the vehicle and hardness of the ground. It provides improved driving performances in terms of stability and adherence of the tire to the ground even on rough grounds of great hardness.

7 Claims, 4 Drawing Sheets

(56) References Cited

FOREIGN PATENT DOCUMENTS

FR          2755400     *  5/1998
JP         61-143259    *  6/1986

OTHER PUBLICATIONS

Machine translation of JP 61-143259, 1986.*
"Mousse", Mar. 4, 2014, XP055251030.
International Search Report and Written Opinion for International Application No. PCT/IB2016/053850 (11 pages) (dated Oct. 4, 2016).

* cited by examiner

FILLING ELEMENT FOR TIRES OF OFF-ROAD MOTOR VEHICLES

CROSS-REFERENCE TO RELATED APPLICATIONS

This application is a 371 of PCT/IB2016/053850, filed Jun. 28, 2016 which claims the benefit of Italian Patent Application No. 102015000029077, filed Jun. 30, 2015.

FIELD OF THE INVENTION

The present invention refers to the field of tires, and more specifically it refers to a filling element made of expanded material for tires of off-road motor vehicles.

STATE OF THE ART

The tires for off-road motor vehicles, in general and in particular during competitions, are subjected to extreme conditions of use both in terms of speed and in terms of type of soil of the road, often extremely hard, sometimes rocky and full of obstacles.

On the other hand, even in such conditions, the tires must ensure optimum performance and safety for the rider, therefore, stability and adhesion even on very hard and irregular grounds. It is also felt the problem of cuts, tears and punctures, which are very frequent given the soil conditions and can therefore impact heavily on the performance of the pilots in the competitions because of the continuous need to replace the tires, and more generally on the costs associated with the replacement and repair of tires.

Now for some decades, to meet these needs, the so called "mousse" have been put on the market, and they are now widely used for off-road motorcycles, they are foam rings that are inserted in the space between tire and rim to fill it, so as to replace the inner tubes. Thanks to their spongy structure, the mousse are able to support the tire during the competitions also in case of holes, without having to replace the tire.

Several types of mousses are known, from those that are directly injected and foamed inside the space between tire and rim, to those that are instead produced by expansion of an elastomer, such as polyurethane, in the form of a ring to be inserted then inside the tire. The methods of expansion for forming the mousse are known and based on vulcanization technologies that allow obtaining foamed materials with honeycomb structure having closed cells, inside which air remains trapped during the expansion process, and it will then constitute the actual support of the tire during use, by simulating the air under pressure of the conventional inner tubes.

As far as the Applicant is aware, all the mousses for tires currently on the market are produced in the form of a ring, having already a size suitable for the insertion into the tire, or in the form of long cylinders, to be cut at the very moment of use of the length required to fill the tire. In both cases the surface or the ring or of the cylinder is smooth and regular, the absence of geometric irregularities being recognized by the experts in this field as essential to ensure adhesion between the mousse and the inner surface of the tire, and therefore to perform its functions of support and filling material.

In more recent years, when the conditions of racing of off-road motorcycles became more extreme, as well as the use of mousses in the tires, there has been experienced a more and more rapid degradation of the expanded filling element due to the mechanical stress and to the heat to which the mousse is subjected, so that the life of this product often is reduced to a single race.

Up to now several attempts have been made to obviate this drawback and to prolong the duration of the mousse; these attempts mostly concern the composition of the mousse and the conditions for carrying out the expansion process. To these aspects changes have been proposed for example in order to homogenize the internal structure of the mousse, in terms of cells size and/or in terms of their distribution, or on the contrary in order to create a precise differentiation of the cells density within the structure. Another attempt to extend the life of the mousse was done by creating through holes parallel to the central axis of a mousse ring, i.e. perpendicular to the longitudinal axis of the mousse cylinder: in this case it was though experienced a worsening of the performance of the device that becomes even more fragile and subject to degradation with use.

As far as the Applicant is aware of, today it is still not solved the technical problem of having available a filling element of expanded material for tires of off-road motor vehicles, or mousse, that has a long life and maintains unchanged its performances as replacement element of inner tubes inside tires, and allows to continue to use the tire even in case of tears, cuts and/or punctures.

SUMMARY OF THE INVENTION

An object of the present invention is therefore to provide a filling element for tires of off-road motor vehicles made of expanded elastomeric material, or mousse, that solves the problems mentioned above, and in particular that has a prolonged duration also following use under extreme conditions of external temperature, hardness of the soil, and speed of motor vehicles, also maintaining good performances as support and filling of tires in replacement of the inner tubes.

A further object of the present invention is to provide a wheel for off-road motor vehicles comprising a tire mounted on a wheel rim and a filling element made of expanded elastomeric material placed in the hollow space between the tire and the rim of the wheel, having a prolonged duration also under the extreme conditions of use mentioned above, and having good stability and adherence to the ground.

These and further objects are obtained by the filling element made of an expanded elastomeric material according to the invention, whose characteristics are described in the first and subsequent claims of the attached claims.

BRIEF DESCRIPTION OF THE DRAWINGS

The invention will be now illustrated in details in the following exemplary, non limitative description of an embodiment thereof, with reference to the attached drawings wherein:

the FIGS. 1a, 1b and 1c are front views of a filling element made of elastomeric expanded material for rims of wheels with different size, according to an embodiment of the invention;

Figure 2:
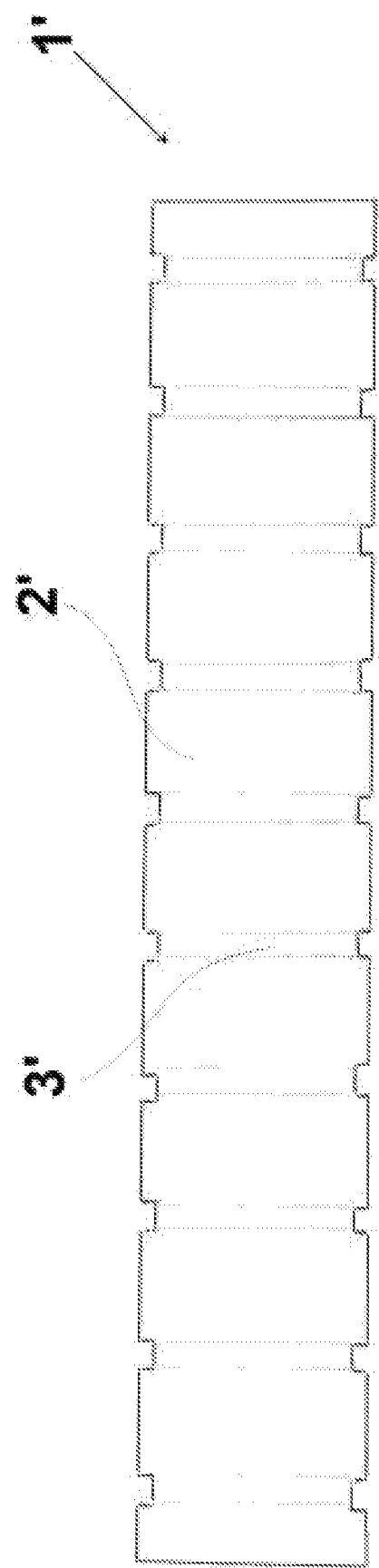

the FIG. 2 is a front view of a filling element made of elastomeric expanded material in the form of a cylinder from which the element of the invention can be obtained by cutting to size and folding.

DETAILED DESCRIPTION OF THE INVENTION

In the present invention by the term "mousse" a filling element is meant for tires of off-road motor-vehicles made of elastomeric expanded material.

Figure 1A:
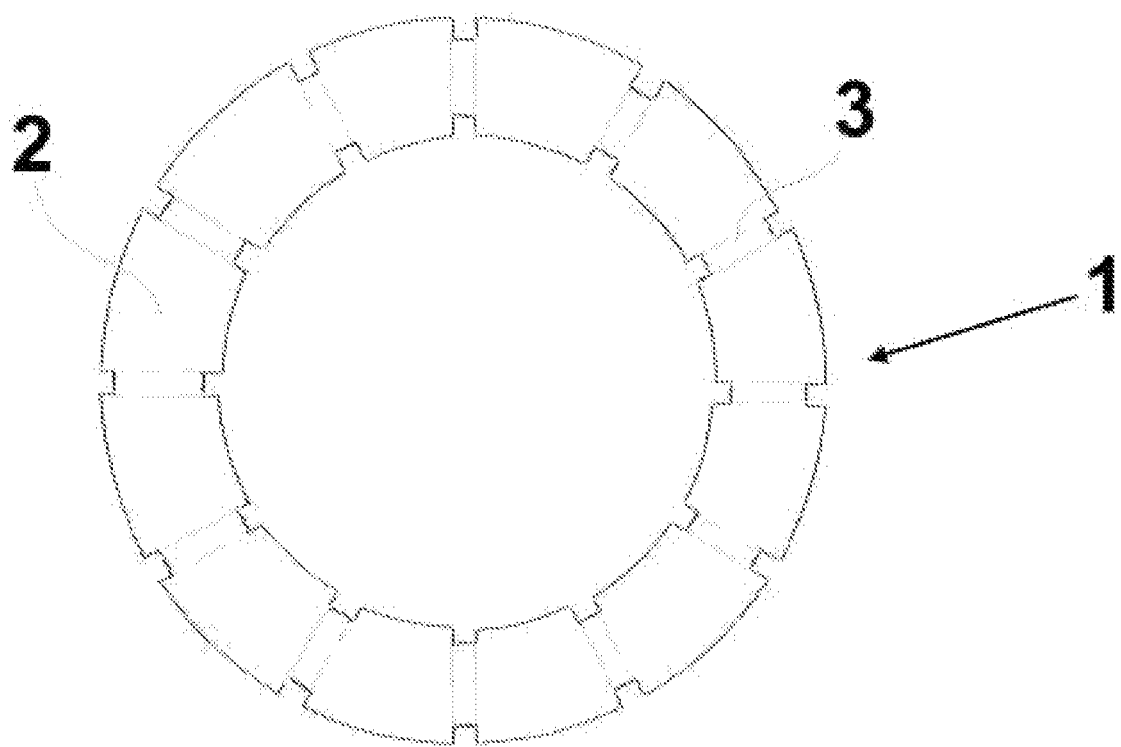
Figure 1B:
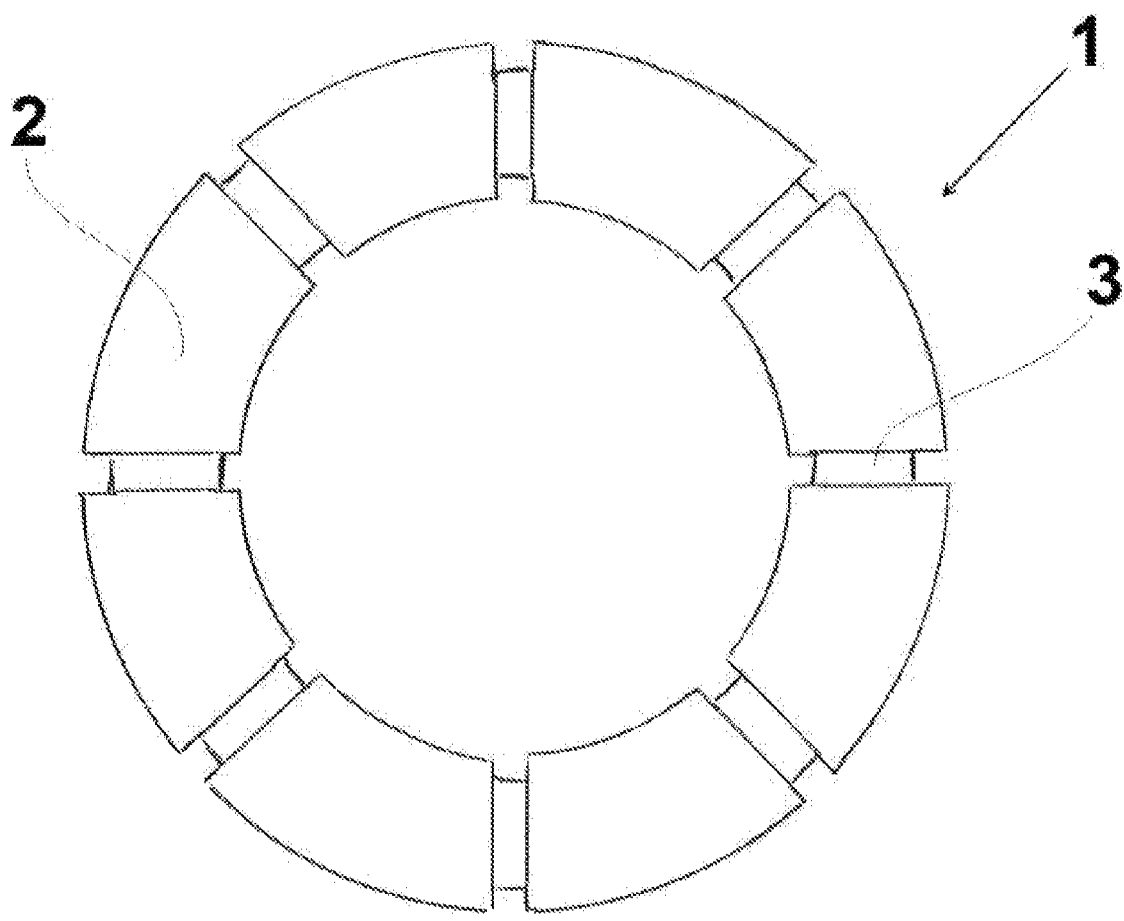
Figure 1C:
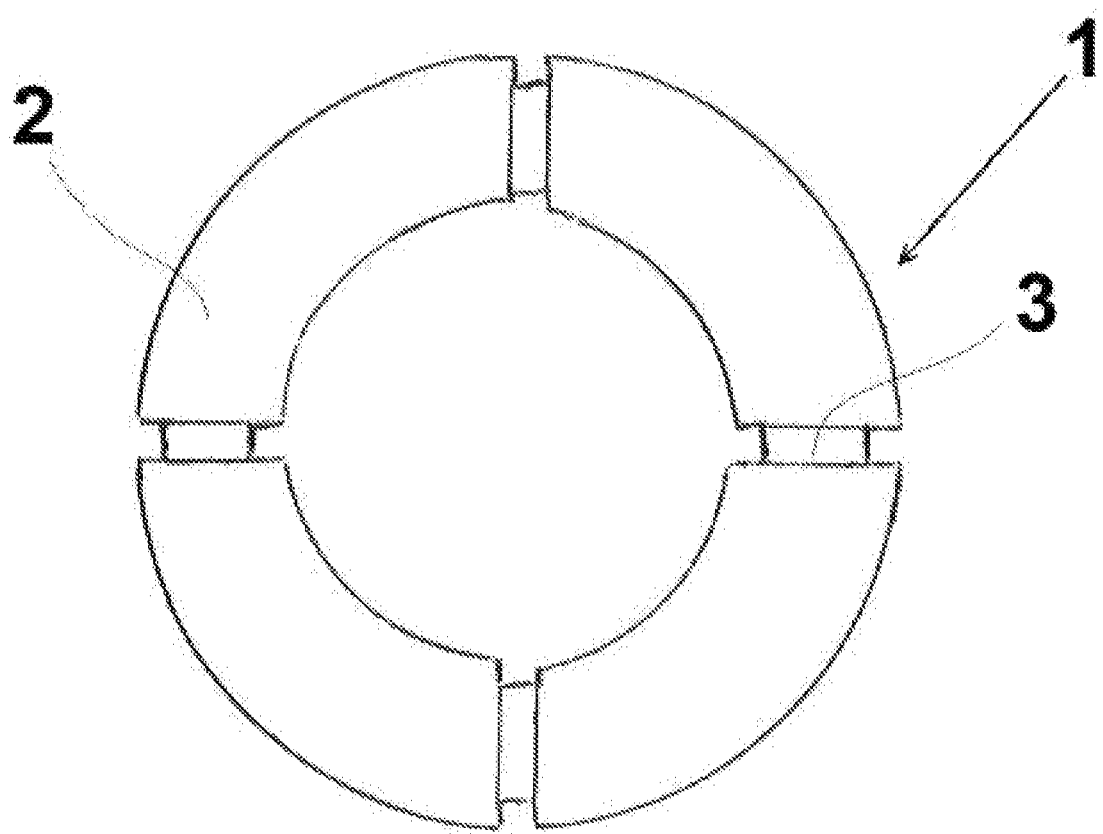

With reference to the above mentioned figures, and in particular to FIGS. 1a, 1b and 1c, a filling element 1 for tires according to a first embodiment of the invention comprises a body 2 having a shape of a toroid in expanded polymeric material, provided on the surface of circular grooves 3, concentric to a generatrix of the toroid, each having uniform depth and width along the entire circumference, and substantially equidistant from each other.

In particular, according to the present invention, the depth of the grooves 3 may be comprised between 5 and 20 mm, and preferably it is comprised between 10 and 15 mm, whereas their width may be comprised between 10 and 30 mm, and preferably it is comprised between 15 and 25 mm. The distance between the above said grooves is uniform and thus varies depending on the number of grooves that is on its turn proportional to the diameter of the rim on which the element is to be mounted: for wheels with rims of standard size, having diameter of 18/19 inches (corresponding to 45.72/48.26 cm of diameter), for instance, filling elements with from 8 to 16 grooves may be used, preferably with 12, while for smaller wheels with rims of diameter of 16 inches (corresponding to 40.64 cm) elements having from 6 to 12 grooves may be used, preferably with 8; even smaller wheels, such as those for minicross racing, of diameter 12/14 inches (corresponding to 30.48/35.56 cm), may instead use elements having from 2 to 6 grooves, preferably with 4 grooves. In FIGS. 1a, 1b and 1c are represented three different filling elements of a first embodiment of the invention in their respective preferred configurations, which vary between each other just for the number of grooves present on the surface.

With reference to the attached FIG. 2, an element 1' is illustrated, which comprises a body 2' having a cylindrical shape in expanded polymeric material, provided on the surface of circular grooves 3', perpendicular to the longitudinal axis of the cylinder and equidistant between each other. This element 1' allows obtaining the element 1 of toroidal form described above, after cutting of a portion of the cylinder of the length suitable for filling completely the tire. The obtainment of the element 1 by folding of the element 1' rather than by direct molding of a toroid, has the advantage that the element 1' may be custom adapted by the user to tires and rims of different diameter obtaining a first filling element 1 having the form of a toroid and storing the remaining portion of cylinder for any possible subsequent substitution of portions of the mousse that are particularly degraded after a first use.

In general, according to the present invention, the number of grooves that may be present on the filling element according to the invention is such that the hollow/solid ratio of the surface of the filling element 1, or of the element 1' mounted in the tire, is for instance comprised between 10 and 30%, and preferably is of about 20%, where by "hollow/solid ratio" of the surface of the filling element is meant the ratio between the total surface of the grooves on the filling element and the total surface of the filling element.

The present filling element 1 or 1' for tires of off-road motor vehicles, in particular off-road motorcycles, may be manufactured by the known technique in expanded elastomeric material, for instance based on butyl rubber. According to a preferred embodiment the material of the filling element has the honeycomb structure of the materials known in the state of the art, with the cells of the honeycomb structure containing pressurized gas, for instance nitrogen.

The Applicant has surprisingly observed that the presence of the above said grooves on the filling element significantly extends their duration even under extreme operating conditions, such as those described above of the off-road competition races. Thanks to the presence of the grooves, the degradation of the mousse due to the high heat transferred to it in the high-speed rolling and also caused by the deformations following collisions with obstacles and jumps on a rocky ground, is reduced. At the same time, in addition to ensuring a long life, it was observed that the use of the present filling element provided with grooves not only does not adversely affect the main function of support and filling that the element must have, but rather has shown in tests carried out on off-road motor vehicles to contribute to greater stability and grip of the tires, when compared with commercial mousses without grooves.

Such behavior of the filling elements for tires of the present invention is even more surprising if you think that the filling elements on the market made with analogous expanded polymeric materials but provided with through holes rather than grooves, have instead shown in tests carried out on off-road motor vehicles a greater tendency to degradation with respect to the same mousses having a smooth surface without holes, suggesting in some way that the uniformity and regularity of the structure of the filling element be essential to preserve a certain resistance to degradation.

The present filling element of expanded polymeric material for tires of off-road motor vehicles, therefore, in addition to achieving the object of providing a filling for the tire that supports it in case of cuts and punctures, is also useful for improving the stability of the motor vehicle and the adherence of the tire so filled onto rough, hard and even on rocky grounds.

EXAMPLES

Evaluation of the Filling Element of the Invention in Off-Road Tests by Comparison with Commercial Mousses Test rides were carried out to compare the behavior of the present filling element with that of the smooth mousses on the market and of the mousses with holes.

The three devices have been tested inside tires for motor vehicles of the types cross 110/90/19 and enduro 140/80/18, with rims of width 2.15 inches (corresponding to 5.461 cm), mounted on an off-road motorcycle Honda 250 cc weighing 105 Kg.

The trail of the enduro motorcycle was of 250 Km, and the average speed of the vehicle was of 50 Km/h, with peaks of maximum speed of 90 Km/h.

The tests were carried out at an external temperature of about 25° C., on a ground of medium hardness, and have shown that the maximum distance that can be covered by the motor vehicle in the above said conditions was definitely greater for the element with grooves of the invention, whereas the mousse with holes has shown a more rapid degradation comparable to that of the smooth mousse. Also the temperatures reached by the tire were different, remaining in any case below 50° C. for the tires with the filling element of the invention, while for the smooth mousses a temperature for the tires of about 8-10° C. higher was measured than for the mousses of the invention, and this put the tire at risk of breaking during the entire journey.

The present invention has been hereto described with reference to preferred embodiments thereof. It is understood that there may be other embodiments afferent to the same inventive core, all falling within the scope of protection of the claims set out below.

The invention claimed is:

1. A filling element for tires of off-road motor vehicles, comprising a body in elastomeric expanded material, having a shape of a toroid wherein said filling element is provided on the surface with circular grooves, concentric to a generatrix of said toroid, said grooves being substantially equidistant between each other, wherein each of said grooves has uniform depth and width along the entire circumference along which said grooves develop and wherein said groves have depth of between 5 and 20 mm, and width of between 10 and 30 mm.

2. The filling element according to claim 1, wherein said element having a shape of a toroid is obtained by bending an element having a cylindrical body in elastomeric expanded material, provided on the surface with circular grooves perpendicular to a longitudinal axis of said cylindrical body.

3. The filling element according to claim 1, wherein said element is made of an elastomeric expanded material with a honeycomb structure having closed cells containing a gas or a gaseous mixture with a pressure higher than atmospheric pressure.

4. The filling element according to claim 1, wherein said grooves have depth of between 10 and 15 mm, and width of between 15 and 25 mm.

5. The filling element according to claim 1, wherein the number of said grooves present on the surface is such that the hollow/solid ratio of the surface of said filling element ranges between 10 and 30%.

6. The filling element according to claim 5, wherein the number of said grooves present on the surface is such that the hollow/solid ratio of the surface of said filling element is of about 20%.

7. A wheel for off-road motor vehicles, comprising a tire mounted on a rim and a filling element as defined in claim 1 and positioned in the space between said tire and said rim of the wheel.

* * * * *